Patented Feb. 27, 1934

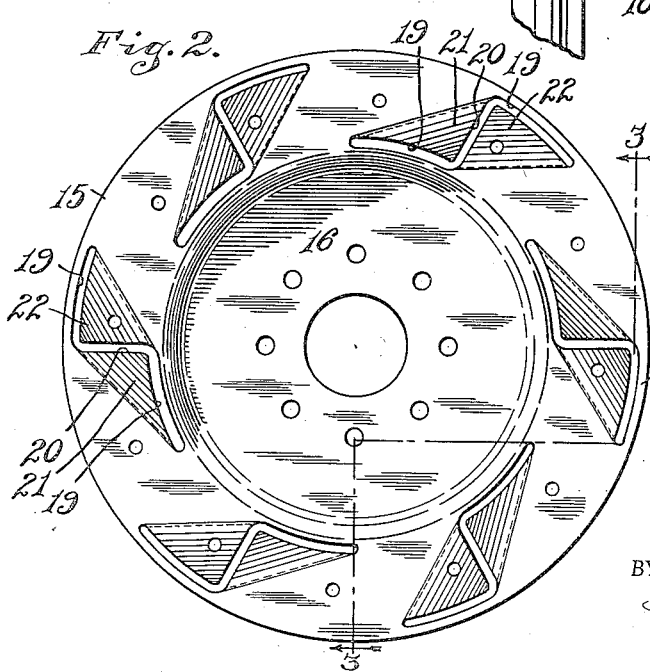

1,949,385

UNITED STATES PATENT OFFICE 1,949,385

CLUTCH DEVICE

James M. Fadely, Muncie, Ind., assignor to Warner Gear Company, Muncie, Ind., a corporation of Indiana Application June 27, 1932. Serial No. 619,441

7 Claims. (Cl. 192—107)

My invention relates to improvements in clutches and particularly to clutch discs.

In certain types of automobile clutches, used for connecting the engine shaft to the drive shaft of the transmission, one member of the clutch is formed as a part of the engine fly wheel, on which wheel is also formed the starter teeth. Another member of the clutch consists of an annular disc normally moved toward the friction face of the fly wheel by suitable springs and moved away from this friction face by the usual clutch pedal mechanism. Interposed between these two members is a clutch disc fastened to the transmission shaft and provided on its opposite faces with friction material to be engaged by the respective faces of the above mentioned two members. My invention relates particularly to this clutch disc and to the provision of a clutch disc of this type which will permit of a "soft" engagement of the clutch.

Other objects and advantages of my invention will appear more fully in the appended specification and claims.

For the purpose of disclosing my invention I have illustrated one embodiment thereof in the accompanying drawing, in which:

Fig. 1 is a longitudinal sectional view of a clutch with which my improved clutch disc may be used;

Fig. 2 is a front elevation of the improved clutch disc;

Fig. 3 is a sectional view on the lines 3—3 of Fig. 2;

Fig. 4 is a front elevation of the clutch disc with the liner of friction material attached thereto;

Figs. 5 and 6 are detailed sectional views of the disc and liner showing the construction of the parts in greater detail, and Fig. 7 is a detail elevation of a modification of my invention.

In the embodiment of the invention illustrated, the fly wheel 1 is attached to the engine shaft 2 in any suitable manner as is now commercially used. This fly wheel has formed on its rear face, a friction face or faces 3. The wheel is provided with an annular flange 4 providing to an extent, a housing portion for the clutch parts. Arranged within the flange 4 and drivingly connected therewith in any suitable manner (not shown) is an annular presser ring 5 having a suitable friction surface 6 on its face thereof. This ring has extending therefrom operating bolts 7 connected with the operating levers 8 which levers at their lower ends are engaged by the thrust collar 9. The levers extend through openings 10 in a housing 11 secured to the annular flange 4 and interposed between this housing and the thrust plate 5 are suitable springs 12 for the purpose of maintaining the thrust plate 5 in its engaging position.

Splinedly mounted on the transmission shaft 13 is a hub 14 having secured thereto a disc 15. This disc is dished at its center portion as at 16 and at its outer portion is provided on each face with annular rings or facings 17 and 18 of friction material. This outer ring portion of the plate has formed therein a series of Z shaped slots 19, a portion of these slots 20 extending substantially radially of the disc and the other portions of the slots extending on lines substantially parallel with the periphery of the disc. The slots thus formed, form in the disc oppositely disposed V shaped portions or ears 21 and 22 which are bent outwardly at their apexes in the same direction. The slots are spaced apart around the disc equidistantly and it is thus seen that there is provided pairs of V shaped outwardly extending lips, the pairs of lips being equidistantly spaced around the disc.

The friction ring or facing 17 is riveted by counter-sunk rivets to what may be termed the body of the disc. The friction ring or facing 18 is riveted by counter-sunk rivets passing through openings 23 to one of each of the pairs of outwardly bent ears. As a result of this construction one of the friction facings is held tightly against the disc and the other facing is held away from the face of the disc by the amount of offset of the sprung ears 21 and 22. However, the two facings are parallel to each other, providing for a full surface contact for both facings, but due to the spring action of the outwardly bent ears a cushioned effect for the engagement of the clutch is provided.

In some instances it has been found that due to the relatively small amount of metal at the point 24 left in the disc as the result of punching the slot 19, this portion becomes bent during the manufacturing and handling process. To avoid this difficulty that portion of the rim is removed during the punching process, at the same time that the slot 19 is punched, leaving the structure in the condition shown in Fig. 7, wherein it will be noted there is left a gap 25. It has been found that no serious difficulty is occasioned by removing this metal, nor is the disc materially weakened, due to the fact that after the facings have been riveted in position, the facings tie the parts together overcoming this apparent weakening effect of removing the portion at 25.

I claim the following:

1. A clutch disc having a plurality of circumferentially spaced pairs of V shaped ears formed therein the apexes of the ears facing in opposite directions and lying side by side, said ears being bent outwardly from the normal plane of the engaging portion of the disc, and an annular facing of friction material secured to at least one of each pair of said outwardly bent ears.

2. A clutch disc having a plurality of pairs of ears formed therein by slotting the disc to separate the metal from the ears on all except one side of said ears, the ears of each pair having their free ends facing one another and lying side by side being bent outwardly from the normal plane of the disc and an annular facing of friction material secured to said ears on one face of the disc.

3. A clutch disc having a plurality of Z shaped slots formed therein to provide a plurality of pairs of V shaped ears in the engaging face of the disc, said ears being bent outwardly from said face, and a facing of friction material secured to at least one of each ear of the pairs.

4. A clutch disc having a plurality of Z shaped slots formed therein to provide a plurality of pairs of V shaped ears in the engaging faces of the disc, the top and bottom portions of said slots extending substantially parallel to the periphery of the disc and a facing of friction material secured at least to one of the pairs of ears.

5. A clutch plate having a plurality of pairs of V shaped wings offset on one side thereof, the apexes of said wings facing one another and lying side by side, a friction ring fastened to said V shaped offset wings on one side of the plate and a friction ring fastened to the opposite side of the plate.

6. A clutch plate having a plurality of pairs of V shaped wings offset on one side thereof, the apexes of the wings of each pair extending in opposite directions and lying side by side, a friction ring fastened to at least one of each pairs of wings on one side of the plate and a second friction ring fastened to the opposite side of the plate.

7. A clutch plate having a plurality of pairs of wings, the wings of each pair being connected to the plate at one point only and having their free ends extending in opposite directions and lying side by side, the free ends of the wings being struck up from the normal plane of the disk.

JAMES M. FADELY.